US008856921B1

(12) United States Patent
McCorkendale et al.

(10) Patent No.: US 8,856,921 B1
(45) Date of Patent: Oct. 7, 2014

(54) THREAT EMERGENCE DATE SCAN OPTIMIZATION TO AVOID UNNECESSARY LOADING OF SCAN ENGINES

(75) Inventors: Bruce McCorkendale, Manhattan Beach, CA (US); William E. Sobel, Jamul, CA (US); Mark Spiegel, West Hills, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1378 days.

(21) Appl. No.: 11/864,768

(22) Filed: Sep. 28, 2007

Related U.S. Application Data

(63) Continuation-in-part of application No. 10/266,340, filed on Oct. 7, 2002, now Pat. No. 7,469,419.

(51) Int. Cl.
*G06F 11/00* (2006.01)

(52) U.S. Cl.
USPC ............. 726/22; 726/24; 726/25; 713/187; 713/188

(58) Field of Classification Search
USPC .............................. 726/22–25; 713/187–188
See application file for complete search history.

(56) References Cited

U.S. PATENT DOCUMENTS

| 2005/0197840 | A1* | 9/2005 | Wang et al. | 704/260 |
| 2006/0021039 | A1* | 1/2006 | Grupe | 726/22 |
| 2006/0021041 | A1* | 1/2006 | Challener et al. | 726/24 |
| 2008/0163372 | A1* | 7/2008 | Wang | 726/24 |

* cited by examiner

*Primary Examiner* — Kambiz Zand
*Assistant Examiner* — Suman Debnath
(74) *Attorney, Agent, or Firm* — Brill Law Office; Jeffrey Brill

(57) ABSTRACT

Threat emergence dates as well as file modification and scanning history are tracked to determine which files need to be scanned for possible infection by various attacking agents. Information concerning which scan engines are used to scan for the presence of different attacking agents is also tracked. Where given files only need to be scanned for a subset of all possible threats and the relevant scanning code resides in only a subset of all the scan engines, only the required scan engines are initialized, loaded or called in order to scan those files.

18 Claims, 5 Drawing Sheets

THREAT EMERGENCE DATE SCAN OPTIMIZATION TO AVOID UNNECESSARY LOADING OF SCAN ENGINES

RELATED APPLICATION AND PRIORITY CLAIM

This patent application is related to and claims priority as a Continuation-In-Part to U.S. patent application Ser. No. 10/266,340 entitled "Performance of Malicious Computer Code Detection," filed on Oct. 7, 2002 now U.S. Pat. No. 7,469,419, and having the same Assignee.

TECHNICAL FIELD

This invention relates generally to improving the performance of malicious computer code detection methods, and more particularly to preemptively determining which scan engines need to be loaded and utilized to scan computer files for malicious code.

BACKGROUND ART

During the brief history of computers, system administrators and users have been plagued by attacking agents such as viruses, worms, and Trojan Horses, which may be designed to disable host computer systems and propagate themselves to connected systems.

In recent years, two developments have increased the threat posed by these attacking agents. Firstly, increased dependence on computers to perform mission critical business tasks has increased the economic cost associated with system downtime. Secondly, increased interconnectivity among computers has made it possible for attacking agents to spread to a large number of systems in a matter of hours.

Attacking agents can infect a system by replacing the executable code stored in existing files. When the system attempts to execute the code stored in these files, it instead executes malicious code inserted by the attacking agent, allowing the attacking agent to gain control of the system. Virus scanning utilities, such as Norton Antivirus, produced by Symantec Corporation of Cupertino, Calif., allow a user to determine whether a file containing executable code has been infected with malicious code.

Traditionally, these utilities have been able to detect viruses by checking for suspicious sections of code in designated locations or looking for other easily detectable characteristics. These methods can be performed quickly, with little burden to system resources.

However, as attacking agents have become more sophisticated, scanning utilities have needed to perform even more complicated tests to detect the presence of malicious code. For example, special purpose code may have to examine large portions of a file or perform complicated emulation techniques to detect the presence of viruses.

These techniques must often be performed serially, and are extremely time and resource intensive. Optimizing these routines sufficiently to prevent them from becoming prohibitively time consuming when applied to a large number of files is becoming extremely difficult as attacking agents grow in number and complexity.

When new malicious code definitions are distributed to a computer, the scanning product typically has to invalidate all the data it has about files it believes are clean. This is because a new definition may have arrived in the definition update that will identify a threat in a file that was previously believed to be clean, based on the previous set of definitions. This may cause tens of thousands of files to be rescanned. System performance will decrease initially when new definitions arrive until the list of clean files is reconstructed by scanning files as they are encountered.

Further slowing down the scanning process is the fact that the code used to scan files for different types and instances of malicious code is often distributed across many separate scan engines. Thus, it is typical to load, initialize, and call each separate Scan engine for every file that is scanned. However, not all definitions that are used to examine the files for malicious code are used by all scan engines.

What is needed are methods, computer readable media and computer systems for speeding up the anti: malicious code scanning process without compromising its accuracy.

SUMMARY

The scanning process is conducted more efficiently by only using required scan engines to scan files for malicious code. Threat emergence dates as well as file modification and scanning history are tracked to determine which files need to be scanned for possible infection by various attacking agents. Information concerning which scan engines are used to scan for the presence of different attacking agents is also tracked. Where given files only need to be scanned for a subset of all possible threats and the relevant scanning code resides in only a subset of all the scan engines, only the required scan engines are initialized, loaded or called in order to scan those files.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention provides for determining whether a computer file 210 contains malicious code by determining whether the file 210 has been changed since a critical date when the file is believed to have been free of infection by the attacking agent, such as a creation date for an attacking agent or a date on which the file 210 was scanned for infection by the attacking agent.

As used herein, the term "malicious code" refers to any program, module, or piece of code that is loaded onto a system without the user's knowledge and/or against the user's wishes. The term "attacking agent" refers to a program which inserts malicious code into a file 210 and includes Trojan Horse programs, worms, viruses, and other such insidious software. An attacking agent may include the ability to replicate itself and compromise other computer systems. As used herein, the terms "infected" and "infect" refer to the process of inserting malicious code in a file.

Figure 1:
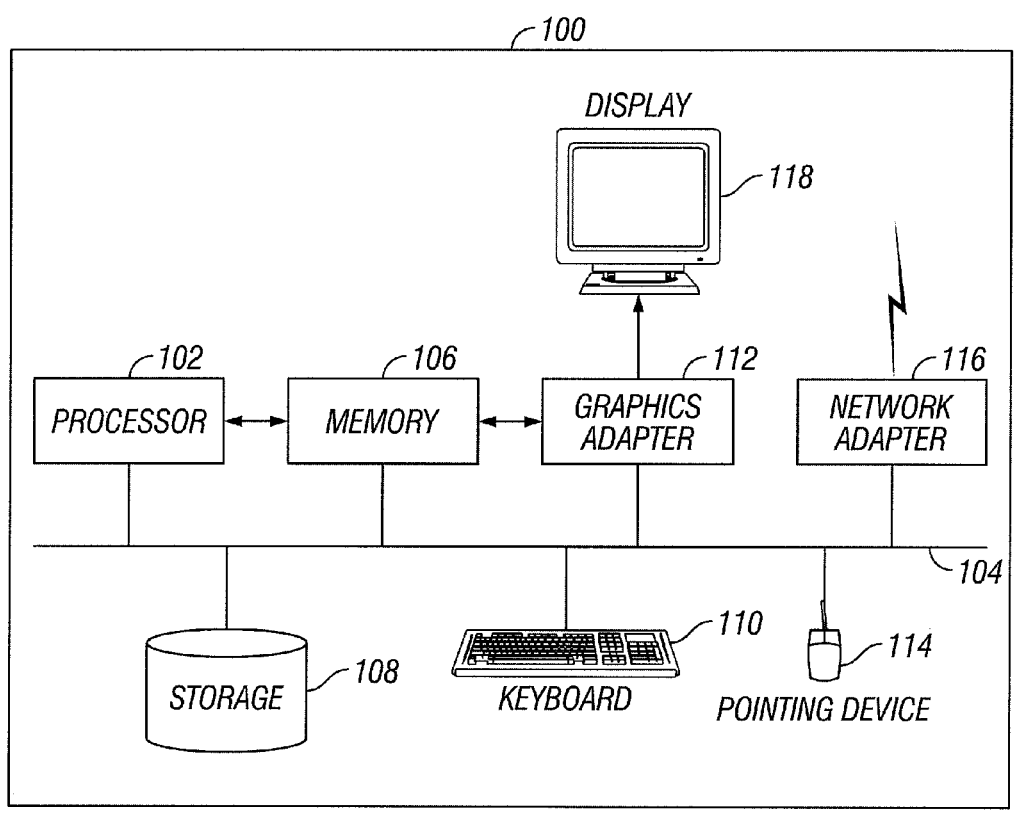
FIG. 1 is a high level block diagram illustrating a computer system, according to some embodiments of the present invention.

FIG. 1 is a high level diagram illustrating a computer system 100. Illustrated are a processor 102 coupled to a bus 104. There may be more than one processor 102. Also coupled to the bus 104 are a memory 106, a storage device 108, a keyboard 110, a graphics adapter 112, a pointing device 114, and a network adapter 116. A display 118 is coupled to the graphics adapter 112.

The storage device 108 may be any device capable of holding large amounts of data, such as a hard drive, compact disk read-only memory (CD-ROM), DVD, or some other form of fixed or removable storage device.

The memory 106 holds instructions and data used by the processor 102. The pointing device 114 may be a mouse, touch-sensitive display, or other type of pointing device and is used in combination with the keyboard 110 to input data into the computer system 100. The types of hardware and software within the computer system 100 may vary.

Figure 2:
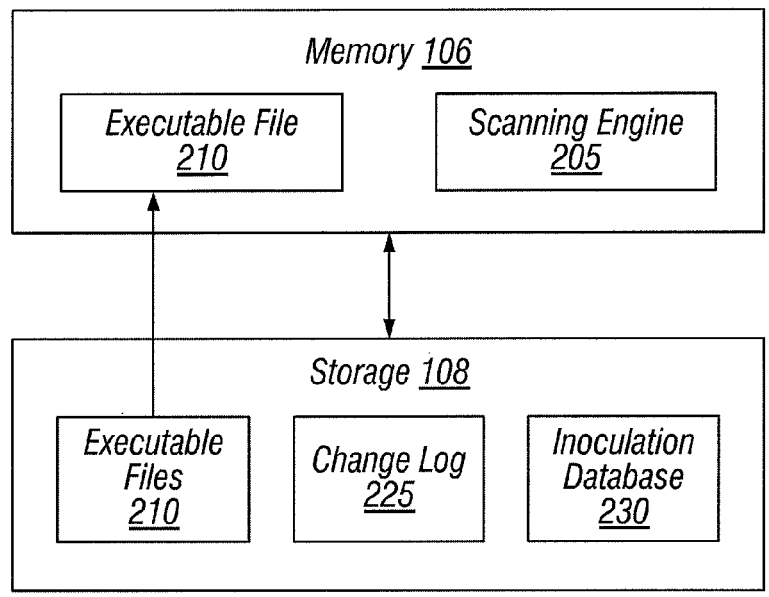
FIG. 2 is a block diagram illustrating a closer view of the memory and the storage of the computer system of FIG. 1, according to some embodiments of the present invention.

FIG. 2 is a block diagram illustrating a closer view of the memory 106 and the storage 108 of the computer system 100 of FIG. 1. The memory 106 includes a scanning engine 205 that detects the presence of malicious code in the computer system 100. The scanning engine 205 identifies data to be checked for the presence of attacking agents, checks for the attacking agents, and, if necessary, responds to a detected attacking agent. Typically, the data to be checked reside in either the storage device 108, the memory 106, or both. The scanning engine 205, therefore, identifies particular files 210 and/or memory locations to be checked for attacking agents. Other data that may be identified by the scanning engine 205 include emails received or sent by the computer system 100, streaming data received from the Internet, etc.

The scanning engine 205 comprises a group of modules that are stored on the storage 108 and loaded into memory 106. As used herein, the term "module" refers to computer program logic and/or any hardware or circuitry utilized to provide the functionality attributed to the module. A module may be implemented in hardware, software, firmware, or any combination of the three.

The storage 108 includes executable files 210, which are files containing executable code to be executed by the computer system 100. As most attacking agents must find a way to cause the system to execute code introduced by the attacking agent, attacking agents often insert malicious code into the executable files 210. Thus, these files 210 are of particular concern in detecting attacking agents. Typically, an executable file 210 is loaded either partially or entirely into memory 106 so that it can be examined by the scanning engine 205.

The storage 108 also includes a change log 225. The change log 225 is maintained by a file system on the computer system 100, and indicates changes that are made to those files 210 controlled by the file system. The file system monitors interaction between applications stored in memory 205 and files 210 in storage 108, and records the changes in the change log 225. Typically, these changes include the times that the file 210 was changed and characteristics of the file 210 before and after the change. The change log 225 may be a circular log of a fixed size, in which the oldest stored changes are replaced with newer changes. Alternatively, the change log 225 may not have a fixed size limit, and can include all changes made to files 210 since the creation of the change log 225.

The scanning engine 205 also maintains an inoculation database 230. The inoculation database 230 stores a plurality of entries, each associated with an executable file 210, relating to the status of the executable file 210. The inoculation database 230 stores an indicator of when the file 210 was last scanned and which detection modules 325 were applied to it. In one embodiment, the scanning engine 205 maintains a log of when the file 210 was last changed. The scanning engine 205 may actively monitor interaction with the file 210 to detect any changes. Alternatively, the scanning engine 205 may store hashes of the executable files 210 in the inoculation database 235 and compare them to newly generated hashes to determine whether the files 210 have changed.

As used herein, a "hash" or "hash function" is a one-way function, from a variable sized input to a fixed size output, that is substantially collision free. Normally, the output is smaller than the input. "One-way" means that it is easy to compute the output from the input, but computationally infeasible to compute the input from the output. "Substantially collision free" means that it is very difficult to find two or more inputs that hash to the same output. Examples of suitable hash functions usable in the present invention are MD5 and a CRC (Cyclic Redundancy Check) function.

Figure 3:
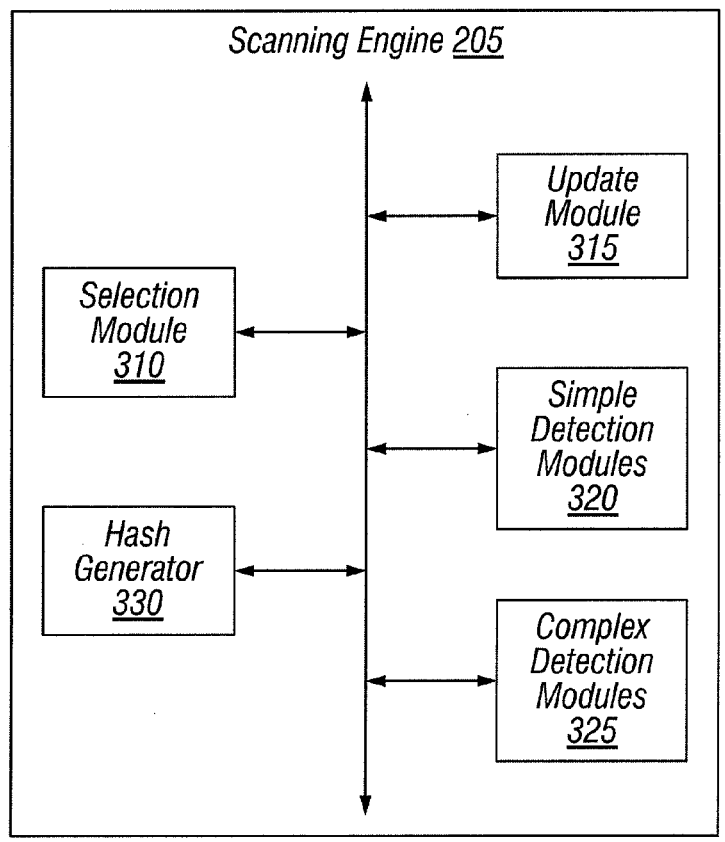
FIG. 3 is a block diagram illustrating a closer view of a scanning engine, according to some embodiments of the present invention.

FIG. 3 is a block diagram illustrating a closer view of a scanning engine 205. The scanning engine 205 includes a selection module 310. The selection module 310 determines which tests to apply to the executable files 210. The selection module 310 is configured to evaluate a database entry 300 for a file 210 and determine which simple detection modules 320 and complex detection modules 325 to apply to the file 210.

A hash generator 330 is configured to generate a hash of an executable file 210. The generated hashes are compared with previously generated hashes to determine when a file 210 was last altered.

The scanning engine 205 includes a group of simple detection modules 320. These detection modules 320 typically check selected areas of a file 210 for distinct code sequences or other signature information. Alternately, they may check the file 210 for distinctive characteristics such as a particular size. Each detection module 320 is associated with a particular attacking agent. These detection modules 320 are typically applied in parallel.

The scanning engine 205 additionally includes a set of complex detection modules 325. These detection modules 325 are configured to perform more advanced tests on a file 210 to determine whether malicious code is present. Additionally, the scanning engine 205 stores information related to the attacking agent in association with the detection module 325 intended to detect the attacking agent.

The scanning engine 205 additionally includes an update module 315 that updates the inoculation database 230. The update module 315 periodically compares the hash stored in the inoculation database 230 to new hashes generated by the hash generator 330. If the hashes are different, the update module 315 stores the new hash in the inoculation database 230 and updates the date of the last change to the file 210 to the current date. Additionally, the update module 315 updates the scan date for a file 210 stored in the inoculation database 230 whenever a complex detection module 325 scans the file 210 for its associated attacking agent.

Figure 4:
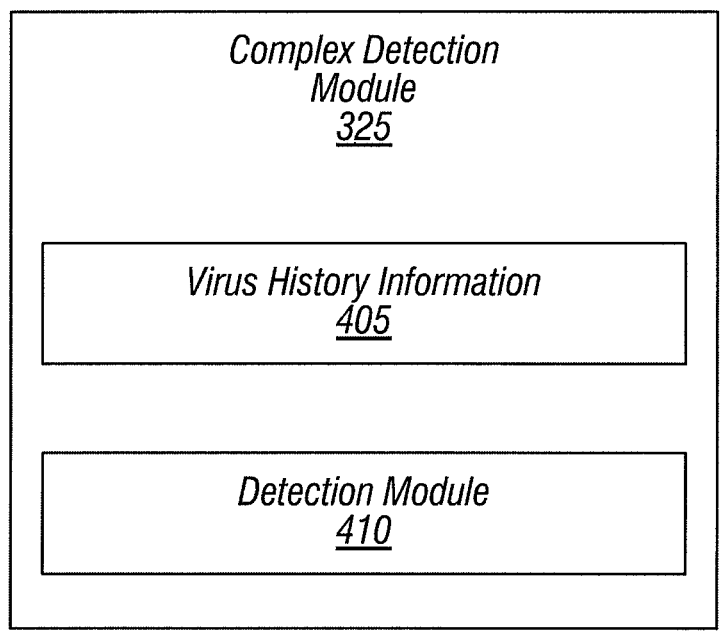
FIG. 4 is a block diagram illustrating a closer view of a complex detection module, according to some embodiments of the present invention.

FIG. 4 is a block diagram illustrating a closer view of a complex detection module 325. Typically, each complex detection module 325 is associated with a particular attacking agent. The complex detection module 325 includes virus history information 405. This information indicates a creation date for the associated attacking agent as well as any other information that may be useful to preemptively determine whether a file 210 has been infected by the attacking agent. The creation date may be the actual date when the attacking agent was believed to be created or a date when the attacking agent was first publicly circulated.

The complex detection module 325 additionally includes detection modules 410 associated with particular attacking agents. These detection modules 410 perform various emulation methods to detect attacking agents that resist signature based detection methods. For example, a complex detection module is necessary to detect the presence of a polymorphic encrypted virus. A polymorphic encrypted virus ("polymorphic virus") includes a decryption routine and an encrypted viral body. To avoid standard detection techniques, polymorphic viruses use decryption routines that are functionally the same for all infected files 210, but have different sequences of instructions. Thus, the scanning engine 205 cannot detect a polymorphic virus by applying one of the simple detection modules 320. Instead, the scanning engine 205 applies a complex detection module 325, which entails loading the executable file 210 into a software-based CPU emulator acting as a simulated virtual computer. The file 210 is allowed to execute freely within this virtual computer. If the file 210 does in fact contain a polymorphic virus, the decryption routine is allowed to decrypt the viral body. The detection module 325 detects the virus by searching through the virtual memory of the virtual computer for a signature from the decrypted viral body. The complex detection modules 325 may also be configured to detect metamorphic viruses, that, while not necessarily encrypted, also vary the instructions stored in the viral body, or any other type of attacking agent that cannot be detected through simple signature based detection.

Typically, each complex detection module 325 is associated with a particular attacking agent and is equipped to detect its presence, though in alternate embodiments multiple detection modules 325 may be associated with a single attacking agent, or a single detection module 325 may be equipped to detect multiple attacking agents. Each complex detection module 325 includes a version number, which is updated whenever a new version of the detection module 325 is installed.

Figure 5:
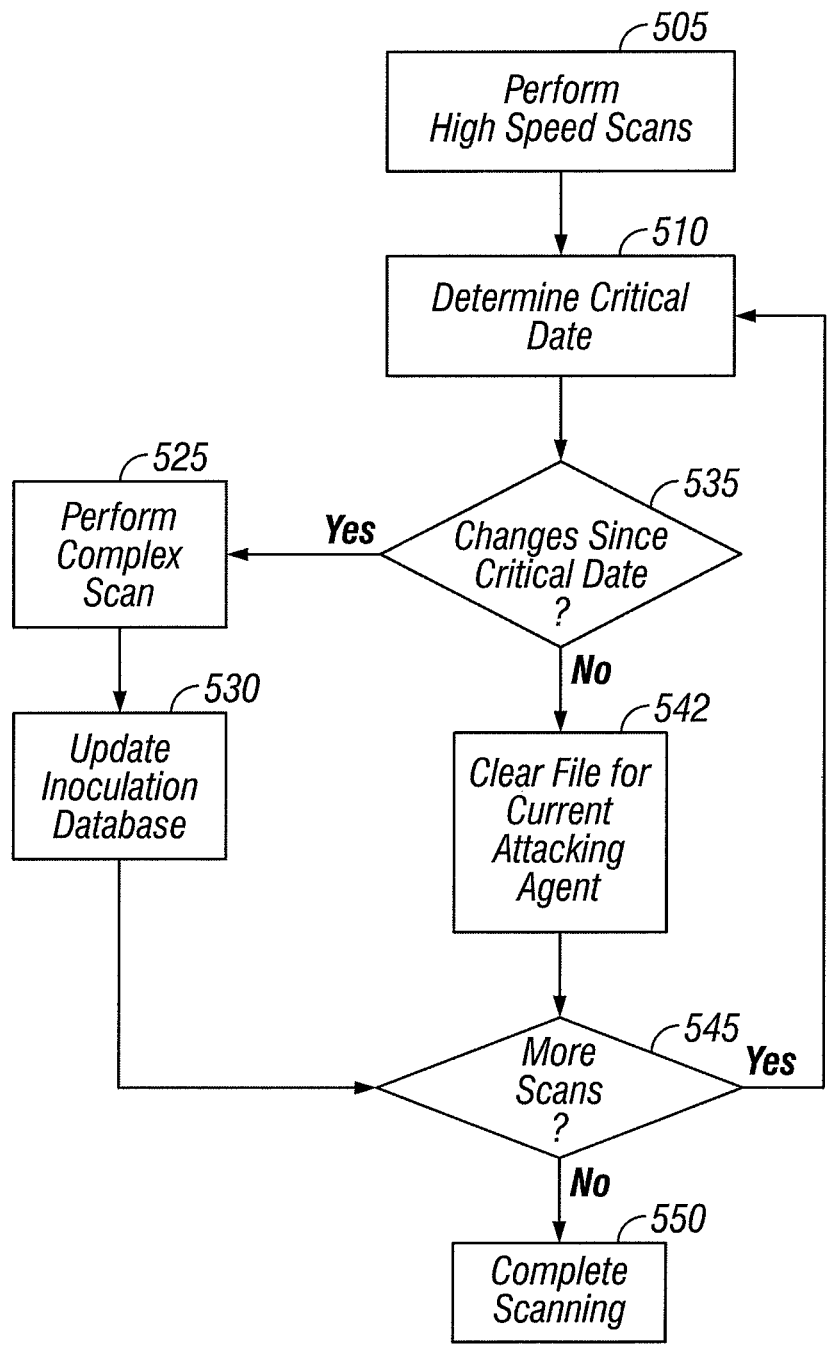
FIG. 5 is a flowchart illustrating a method for detecting malicious code in a file, according to some embodiments of the present invention.

FIG. 5 is a flow chart illustrating a method for detecting malicious code in a file 210. The process begins with the scanning engine 205 applying 505 the simple detection modules 320 to the file 210 to be scanned. Typically, this process is performed until all of the simple detection modules 320 have been applied to the file 210. The selection module 310 then begins to serially determine for each of the complex detection modules 325 whether the file 210 should be scanned. At step 510, the selection module 310 determines the critical date for the attacking agent. In one embodiment, the critical date is the creation date for the attacking agent as stored in the virus history information 405. Alternatively, the critical date might be the last time the file 210 was scanned with the particular complex detection module 325 in question. This can be determined by the selection module 310 checking the inoculation database 230 to determine the last time that the current complex detection module was applied to the file 210. Alternately, the critical date may be any other date when the file 210 was believed to be free of infection by the attacking agent.

The selection module 310 then determines 535 whether the file 210 has been changed since the critical date. The selection module 310 may check the change log 225 and determine when the last change to the file 210 occurred. Alternatively, the selection module 310 may check the inoculation database 230 to determine when the last change occurred. If the date when the file 210 last changed is not earlier than the critical date, then the selection module 310 directs the detection module 325 to scan 525 the file 210 for its associated attacking agent. If the date when the file 210 was last changed is later than the critical date the scanning engine 205 determines 542 that the file 210 has not been infected by the current attacking agent.

When the file 210 has been scanned with one of the complex detection modules 325, the update module 315 replaces 530 the scan date stored in the inoculation database 215 with the current date.

The selection module 310 then determines 545 whether the file 210 should be scanned for additional attacking agents. Preferably, the file 210 is checked by each detection module 325 for its associated attacking agent. If the file 210 needs to be scanned for additional attacking agents, the process is repeated from step 510 for each remaining detection module 325. If the file 210 does not need to be scanned for additional attacking agents, the scanning engine completes 550 the scanning process.

The above description in conjunction with FIGS. 1-5 describes speeding up the scanning processes within the context of a single scan engine 205. In the embodiments illustrated in FIGS. 1-5, the single scan engine 205 is always loaded and called in order to scan a file 210 for malicious code, even though only a subset of the complex detection modules 325 of the engine 205 may need to be used to check the file 210.

Figure 6:
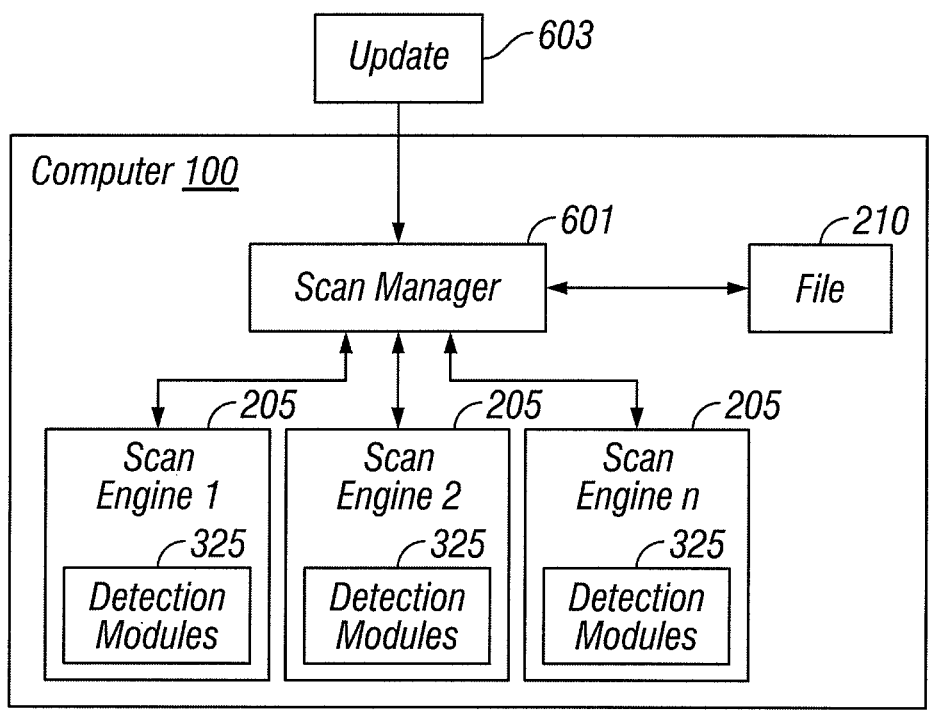
FIG. 6 is a block diagram illustrating a system for improving the speed of the scanning process by only loading necessary scan engines, according to some embodiments of the present invention.

As noted above, in practice, the scanning code is often distributed among multiple scan engines 205. In other words, the multiple complex detection modules 325 may not reside in a single scan engine 205, but instead in multiple scan engines 205. Additional improvements in the streamlining of the scanning process can be made by only loading needed scanning engines 205. FIG. 6 illustrates a system for utilizing such an improvement, according to some embodiments of the present invention. It is to be understood that although various components are illustrated in FIG. 1 as a separate entities, each illustrated component represents a collection of functionalities which can be implemented as software, hardware, firmware or any combination of these. Where a component is implemented as software, it can be implemented as a standalone program, but can also be implemented in other ways, for example as part of larger program, as a plurality of separate programs, as a kernel loadable module, as one or more device drivers or as one or more statically or dynamically linked libraries.

As with the embodiments described above in conjunction with FIGS. 1-5, critical dates are tracked to determine which files 201 need to be scanned for possible infection by various attacking agents. In the embodiments illustrated in FIG. 6, a scan manager 601 also tracks the various scan engines 205 used to scan for the presence of the different attacking agents. Where a given file 210 only needs to be scanned by a subset of the complex detection modules 325, if the relevant complex detection module(s) reside in only one or fewer than all of the scan engines 205, only a subset of the scan engines 205 need to be utilized.

For example, suppose a malicious code definition update 603 is received by a user computer 100. According to this embodiment, the set of scan engines 205 needed (e.g., in the form of a bitmask or other indicator) as well as the relevant threat emergence dates is included in the update 603. In other words, when a definition update 603 arrives on a user's computer 100, the scan manager 603 receives data concerning which scan engines 205 are referenced by the update 603. When multiple definition updates 603 are involved, the corresponding sets of scan engines 205 can be combined to get a single complete set of relevant scan engines 205 (for example, by using an OR operation to combine the bitmasks).

Thus, in addition to determining which files 210 need to be scanned for which malicious code definitions, in this embodiment, the scan manager 601 also determine which scan engines 205 are needed to scan for the attacking agents at issue. More specifically, when a file 210 is accessed after a definition update 603, the various critical dates are used as described above to determine if the file 210 needs to be scanned for any of the malicious code definitions in the update 603. If the file 210 has not been modified since the threat emergence date of any of the new definitions, the file 210 does not need to be scanned for the new threats. If the file 210 has been modified since one or more threat emergence dates, then it does need to be scanned for one or more new threat definitions.

Because the scanning manager 601 knows which threats the file 210 needs to be scanned for, as well as which scan engines 205 are used to scan for those new definitions, the scan manager 601 can initialize and call into only the needed scan engines 205. By avoiding the initialization of and calls to the unneeded scan engines 205, the scanning process is made considerably faster. Previously, every file 210 needed to be rescanned with every scan engine 205 being loaded and called.

Although the application discusses the scanning of executable files 210 as being of particular importance, it is to be understood that the techniques of the present invention can be used to scan any type of file or content as desired. Furthermore, the application discusses storing file modification date and scanning history data in a change log 225 and inoculation database 230. It is to be understood that the change log 225 and inoculation database 230 describe specific implementations, but that any secure, accurate, and reasonably tamper resistant storage environment can be utilized as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for optimizing malicious code scanning for updated definitions, the method comprising the steps of:
   determining, by a computer, a set of at least one threat of a computer system for which at least one file is to be scanned;
   determining, by the computer, which of a plurality of scan engines are required to scan the at least one file using definitions for the first set of at least one threat;
   utilizing, by the computer, only first required scan engines to scan the at least one file for the set of at least one threat;
   receiving, by the computer, at least one malicious code update comprising definitions of a second set of at least one threats that differs from definitions of the first set of at least one threats;
   responsive receiving to the updated definitions, loading a second set of scan engines corresponding to the updated definitions for the second set of threats, the second set of scan engines corresponding to the updated definitions and differing from the first set of scan engines corresponding to definitions of the first set of at least one threats; and
   utilizing, by the computer, only the second required scan engines to rescan the at least one file for the second set of at least one threat.

2. The method of claim 1 wherein determining, by the computer, a set of at least one threat for which at least one file is to be scanned further comprises:
   examining, by the computer, a threat emergence date of at least one threat, and a last modification date and scanning history of the at least one file; and
   including, by the computer, only the those threats for which it is determined, based on the examining step, that the at least one file could be infected, in the set of at least one threat for which the at least one file is to be scanned.

3. The method of claim 1 wherein determining, by the computer, which of a plurality of scan engines are required to scan the at least one file for the set of at least one threat further comprises:
   for each threat of the set, determining, by the computer, which scan engine is required to scan for that threat.

4. The method of claim 1 wherein utilizing, by the computer, only required scan engines to scan the at least one file for the set of at least one threat further comprises:
   initializing, loading and calling, by the computer, only at least one scan engine determined to be required to scan the at least one file for the set of at least one threat.

5. The method of claim 1 further comprising:
receiving, by the computer, at least one malicious code definition update, the malicious code definition update additionally comprising an indication of which scan engines are required to scan for the new malicious code definitions, as well as relevant threat emergence dates; and
performing, by the computer, the determining a set of at least one threat step, the determining which of a plurality of scan engines are required step and the utilizing only required scan engines step, responsive to receiving the at least one malicious code definition update.

6. At least one non-transitory computer readable medium storing a computer program product for optimizing malicious code scanning for updated definitions, the computer program product comprising:
program code for determining a set of at least one threat for which at least one file is to be scanned;
program code for determining which of a plurality of scan engines are required to scan the at least one file using definitions for the first set of at least one threat;
program code for utilizing only first required scan engines to scan the at least one file for the set of at least one threat;
program code for receiving at least one malicious code update comprising definitions of a second set of at least one threats that differs from definitions of the first set of at least one threats;
program code for, responsive receiving to the updated definitions, loading a second set of scan engines corresponding to the updated definitions for the second set of threats, the second set of scan engines corresponding to the updated definitions and differing from the first set of scan engines corresponding to definitions of the first set of at least one threats; and
program code for utilizing only the second required scan engines to rescan the at least one file for the second set of at least one threat.

7. The computer program product of claim 6 wherein the program code for determining a set of at least one threat for which at least one file is to be scanned further comprises program code for:
examining a threat emergence date of at least one threat, and a last modification date and scanning history of the at least one file; and
including only the those threats for which it is determined, based on the examining step, that the at least one file could be infected, in the set of at least one threat for which the at least one file is to be scanned.

8. The computer program product of claim 6 wherein the program code for determining which of a plurality of scan engines are required to scan the at least one file for the set of at least one threat further comprises program code for:
for each threat of the set, determining which scan engine is required to scan for that threat.

9. The computer program product of claim 6 the program code for wherein utilizing only required scan engines to scan the at least one file for the set of at least one threat further comprises program code for:
initializing, loading and calling only at least one scan engine determined to be required to scan the at least one file for the set of at least one threat.

10. The computer program product of claim 6 further comprising:
program code for receiving at least one malicious code definition update, the malicious code definition update additionally comprising an indication of which scan engines are required to scan for the new malicious code definitions, as well as relevant threat emergence dates; and
program code for performing the determining a set of at least one threat step, the determining which of a plurality of scan engines are required step and the utilizing only required scan engines step, responsive to receiving the at least one malicious code definition update.

11. A computer system for optimizing malicious code scanning for updated definitions, the computer system comprising:
a processor;
a memory, comprising:
means for determining a set of at least one threat for which at least one file is to be scanned;
means for determining which of a plurality of scan engines are required to scan the at least one file using definitions for the first set of at least one threat;
means for utilizing only first required scan engines to scan the at least one file for the set of at least one threat;
means for receiving at least one malicious code update comprising definitions of a second set of at least one threats that differs from definitions of the first set of at least one threats;
means for, responsive receiving to the updated definitions, loading a second set of scan engines corresponding to the updated definitions for the second set of threats, the second set of scan engines corresponding to the updated definitions and differing from the first set of scan engines corresponding to definitions of the first set of at least one threats; and
means for utilizing, by the computer, only the second required scan engines to rescan the at least one file for the second set of at least one threat.

12. The computer system of claim 11 wherein the means for determining a set of at least one threat for which at least one file is to be scanned further comprise means for:
examining a threat emergence date of at least one threat, and a last modification date and scanning history of the at least one file; and
including only the those threats for which it is determined, based on the examining step, that the at least one file could be infected, in the set of at least one threat for which the at least one file is to be scanned.

13. The computer system of claim 11 wherein the means for determining which of a plurality of scan engines are required to scan the at least one file for the set of at least one threat further comprise means for:
for each threat of the set, determining which scan engine is required to scan for that threat.

14. The computer system of claim 11 the means for wherein utilizing only required scan engines to scan the at least one file for the set of at least one threat further comprise means for:
initializing, loading and calling only at least one scan engine determined to be required to scan the at least one file for the set of at least one threat.

15. The computer system of claim 11 further comprising:
means for receiving at least one malicious code definition update, the malicious code definition update additionally comprising an indication of which scan engines are required to scan for the new malicious code definitions, as well as relevant threat emergence dates; and
means for performing the determining a set of at least one threat step, the determining which of a plurality of scan engines are required step and the utilizing only required scan engines step, responsive to receiving the at least one malicious code definition update.

16. The method of claim 1, wherein hardware configurations of the computer system remain consistent when scanned for the first set of at least one threat compared to when rescanned for the second set of at least one threat.

17. The method of claim 6, wherein hardware configurations of the computer system remain consistent when scanned for the first set of at least one threat compared to when rescanned for the second set of at least one threat.

18. The method of claim 11, wherein hardware configurations of the computer system remain consistent when scanned for the first set of at least one threat compared to when rescanned for the second set of at least one threat.

* * * * *